(No Model.)
M. S. E. PITTMAN.
CULTIVATOR.
No. 246,551. Patented Aug. 30, 1881.
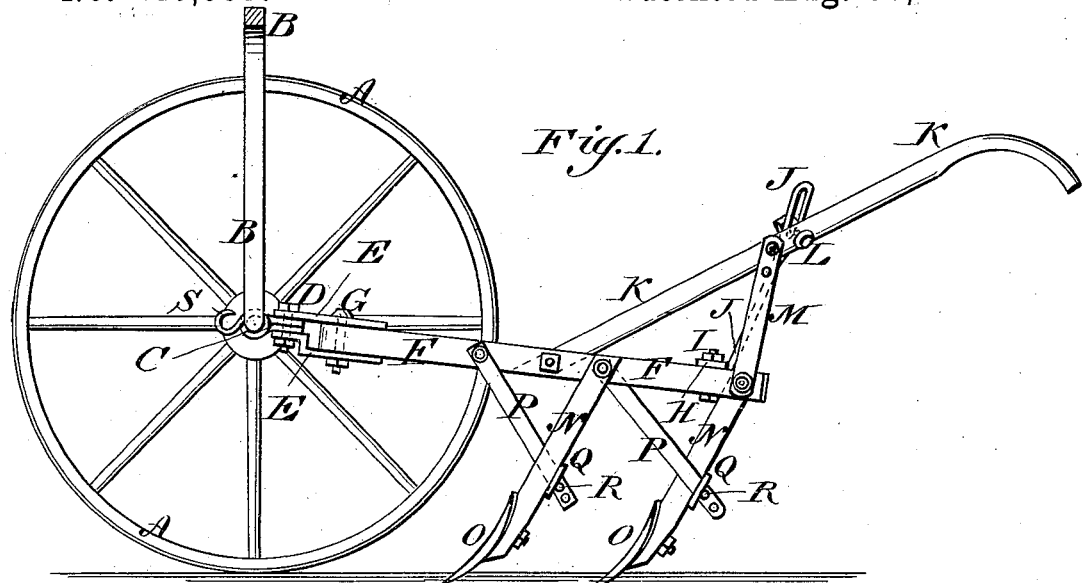
Fig. 1.
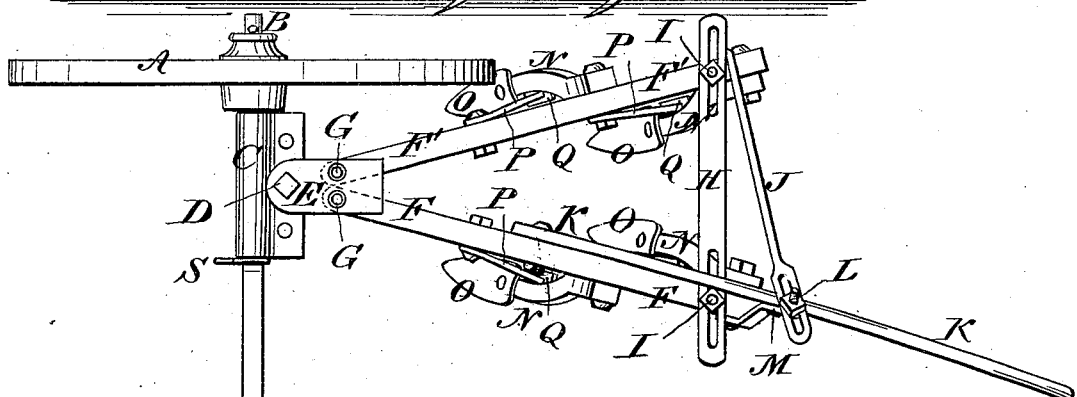
Fig. 2.
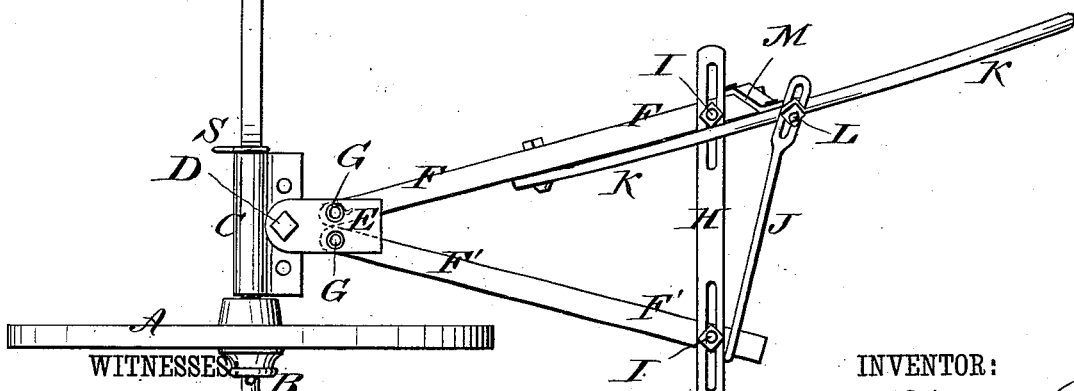
WITNESSES
Dopn P. Twitchell.
C. Sedgwick
INVENTOR:
M. S. E. Pittman
BY Munn &Co
ATTORNEYS.

UNITED STATES PATENT OFFICE.

MOSES S. E. PITTMAN, OF HARLEM, MISSOURI.

CULTIVATOR.

SPECIFICATION forming part of Letters Patent No. 246,551, dated August 30, 1881.

Application filed March 19, 1881. (No model.)

*To all whom it may concern:*

Be it known that I, MOSES S. E. PITTMAN, of Harlem, in the county of Clay and State of Missouri, have invented a new and useful Improvement in Cultivators, of which the following is a specification.

Figure 1 is a sectional side elevation of my improvement, taken through the line $x$ $x$ of Fig. 2. Fig. 2 is a plan view of the same.

Similar letters of reference indicate corresponding parts.

The object of this invention is to facilitate the cultivation of plants and the adjustment of the cultivators to the distance apart of the rows of plants.

A are the wheels, which revolve upon the ends of the arched axle or draft-bar B. Upon the horizontal end parts of the arched bar B are placed long coupling blocks or sleeves C, which have flanges upon their rear sides, the said flanges having a number of holes formed through them to receive the coupling pins or bolts D. The pins or bolts D also pass through holes in the forward ends of the coupling-plates E, to and between the rear ends of each pair of which are pivoted the forward ends of two plow-beams, F F', by bolts G, so that the rear ends of the said plow-beams can be adjusted at a greater or less distance apart, as may be desired. The forward parts of the lower coupling-plates, E, are made with an upward offset, as shown in Fig. 1, so that the forward ends of the said lower plates, E, will rest against the lower sides of the flanges of the coupling-sleeves C, while the forward ends of the upper plates, E, rest upon the upper sides of the said flanges, as shown in Fig. 1. With this construction the movements of the coupling-sleeves C upon the arched draft-bar B give a vertical play to the plow-beams, and the movements of the coupling-plates E upon the pins or bolts D give a lateral play to the said plow-beams. With this construction, also, the draft is applied directly to both plow-beams, so that there will be no side draft, all the plows being drawn forward in straight lines.

The plow-beams F F' of each pair incline from each other as they pass back, and are connected at or near their rear ends by a cross-bar, H, the end parts of which are slotted longitudinally to receive the bolts I that secure them to the said plow-beams F F', so that the rear ends of the plow-beams F F' can be adjusted wider apart or closer together by loosening the bolts I. The rear end of the outer beam, F', of each pair is further secured in place by a brace, J, the outer end of which is secured to the rear end of the said outer beam, F'. The inner end of the brace J crosses the handle K, and is slotted longitudinally to receive the bolt L that secures it to the said handle K, so that the outer plow-beam, F', can be adjusted by loosening the said bolt L and one or both the bolts I. By this construction the handles K will be strengthened in place without interfering with the adjustment of the plow-beams F F'. The forward end of each handle K is bolted to the inner beam, F, and its rear part is supported at the desired elevation by an upright, M. The lower end of the upright M is bolted to the rear part of the inner beam, F, and its upper end is bolted to the handle K. Several holes are formed in the uprights M to receive the fastening-bolts, so that the height of the rear ends of the handles K can be adjusted as the convenience of the plowman may require.

To the inner sides of the rear ends of the beams F F' of each pair are bolted the upper ends of standards N; and to the outer sides of the said beams F F', at a little distance from their rear ends, are bolted the upper ends of similar standards, N.

To the lower ends of the standards N are attached shovel-plows O or other suitable plows. The draft-strain upon each standard N is sustained by a brace-bar, P, the forward end of which is bolted to the side of a beam, F or F', and its rear end passes through a keeper, Q, attached to the said standard N.

In the rear end of each brace P is formed a hole to receive a wooden pin, R, which rests against the rear side of the keeper Q, and is made large enough to sustain the draft-strain under ordinary circumstances; but should the plow strike an obstruction the pin R will break and allow the standard N to swing back to prevent the plow from being broken. With this construction the plows of each pair of plow-beams will cultivate the space between two rows of plants, so that two rows will be finished at each passage of the cultivator across the field, except the first passage. With this construction, also, when the plants become too large to pass beneath the arched draft-bar B, the pairs of beams can be detached and each pair used as a cultivator, a second handle being attached to each outer beam, if desired. The draft is applied to hooks S attached to the draft-bar B at the ends of the couplings C, so as to bring the point of draft attachment close to the plow-beams.

Having thus fully described my invention, I claim as new and desire to secure by Letters Patent—

In a cultivator, the combination, with the draft-bar or axle B, of the flanged sleeve C, having a series of holes, the plates E, pivoted on vertical bolts D, the beams F F', pivoted on plates E by vertical bolts G, the handles K, and the connecting-bars H J, slotted to work on bolts I L, as shown and described.

MOSES SAMUEL EDWARD PITTMAN.

Witnesses:
   JOHN B. REESE, Sr.,
   J. E. BENDER.